May 1, 1923.
U. PEDROARENA
CULTIVATOR AND HARROW
Filed April 6, 1922
1,453,944
2 Sheets-Sheet 1
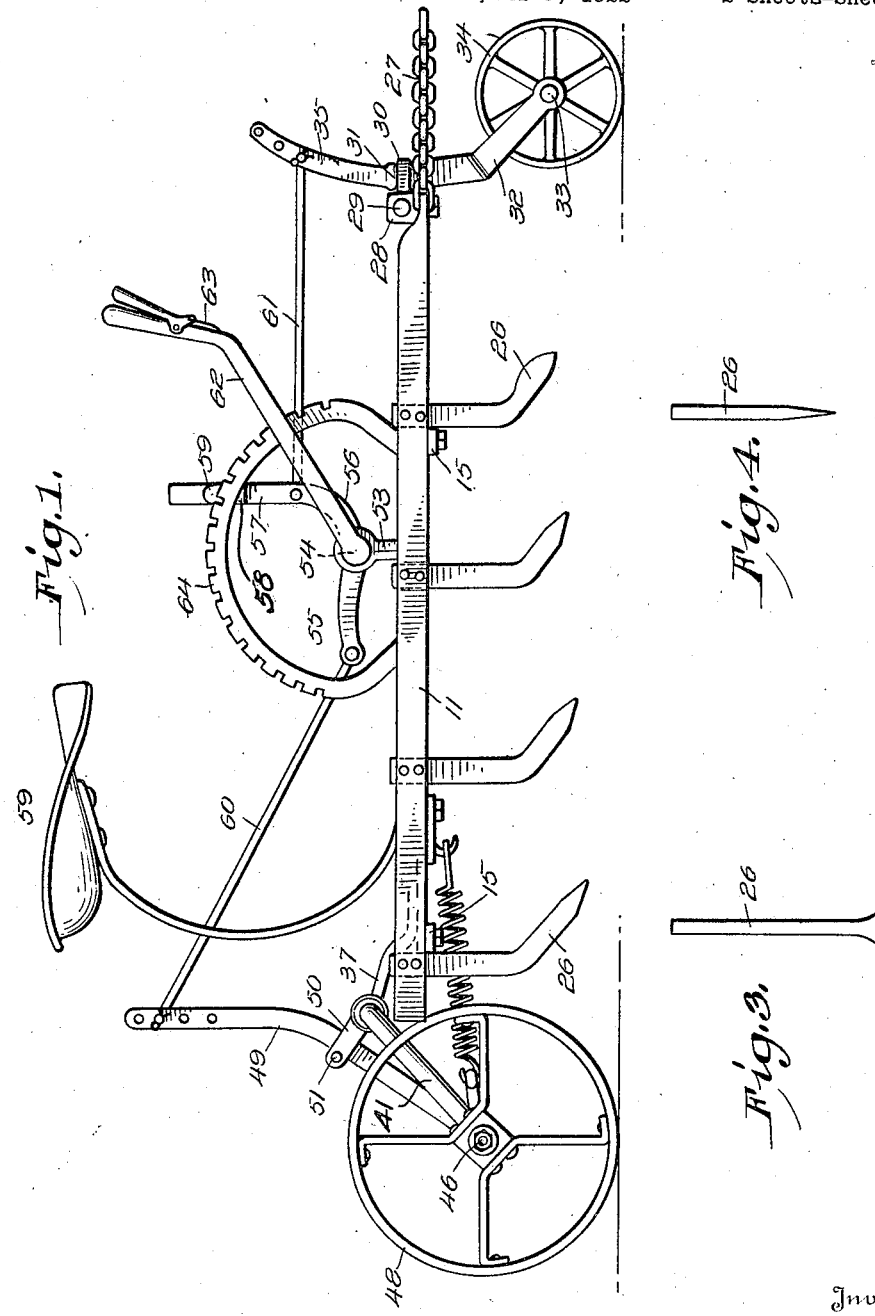
Inventor
Urbano Pedroarena
By Geo. P. Kimmel
Attorney

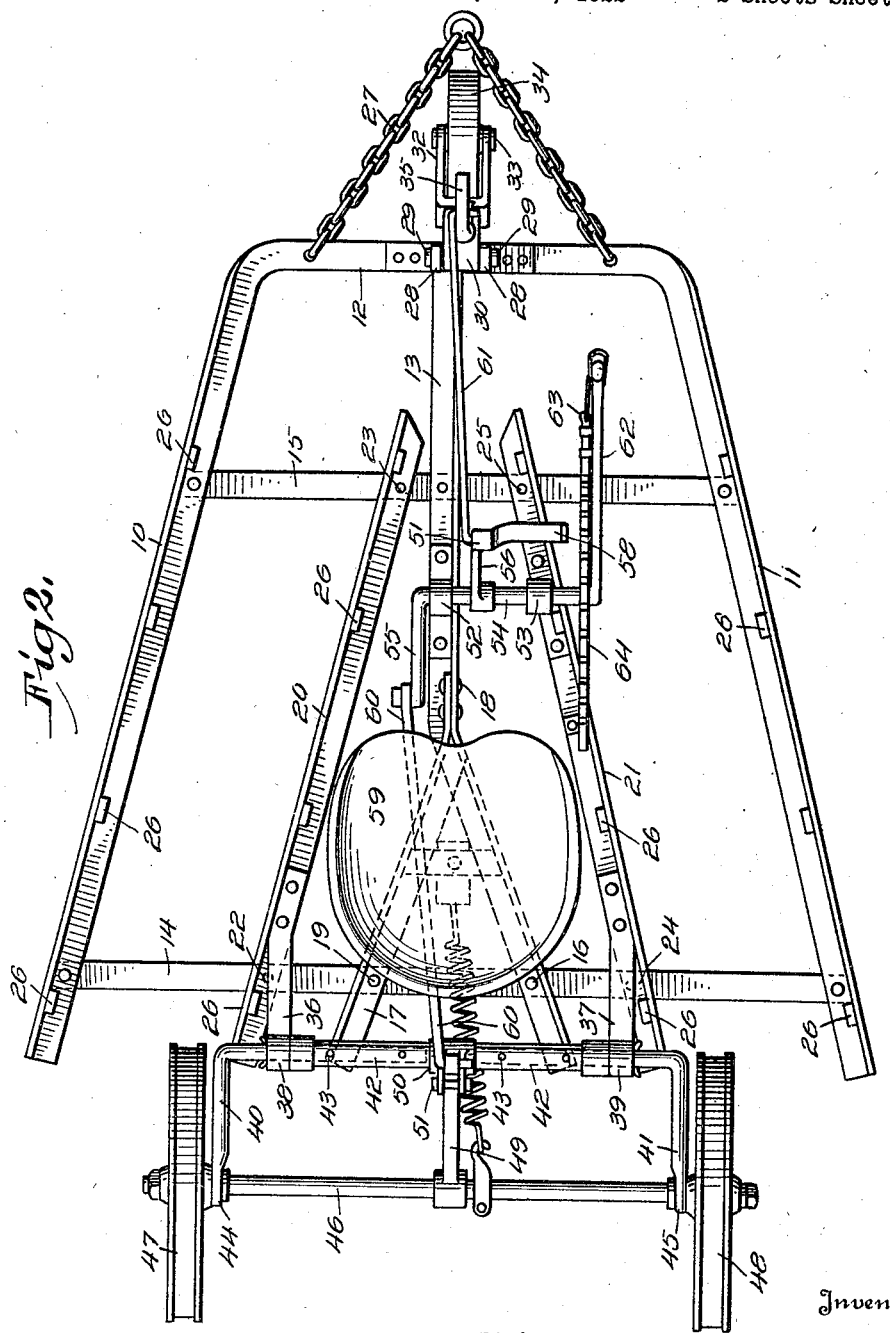

Patented May 1, 1923.

1,453,944

UNITED STATES PATENT OFFICE.

URBANO PEDROARENA, OF GARDNERVILLE, NEVADA.

CULTIVATOR AND HARROW.

Application filed April 6, 1922. Serial No. 550,089.

*To all whom it may concern:*

Be it known that I, URBANO PEDROARENA, a citizen of the United States, residing at Gardnerville, in the county of Douglas and State of Nevada, have invented certain new and useful Improvements in Cultivators and Harrows, of which the following is a specification.

This invention relates to agricultural implements of the class of harrows, cultivators, clod crushers and the like, and has for one of its objects to provide a device of this character having means whereby the earth engaging elements may be adjusted to control the depth of their action, or elevated to entirely free them from the ground as required.

With these and other objects in view the invention consists in certain novel features of construction as hereinafter shown and described and then specifically pointed out in the claims, and in the drawings illustrative of the preferred embodiment of the invention:—

Figure 1 is a side elevation, and—

Fig. 2 is a plan view of the improved implement.

Figs. 3 and 4 are views of two forms of harrow teeth, employed in connection with the improved implement.

The improved implement includes a supporting frame, preferably constructed as shown of outer or side portions 10 and 11, forward portion 12, a central or "back bone" member 13, and transverse stay members 14 and 15, the latter riveted or otherwise rigidly attached to the side portions and to the back bone member.

The side members 10 and 11 diverge toward the rear, while the forward portion of the back bone member 13 is directed longitudinally of the frame with the rear portion bent laterally toward the rear and riveted or otherwise attached to the rear transverse member 14, as shown at 16, while another frame member 17 extends obliquely to the longitudinal axis of the frame and is riveted or otherwise attached at 18 and 19 to the members 13 and 14.

Two other frame members 20 and 21 are riveted or otherwise attached at 22, 23, 24, and 25 to the transverse members 14 and 15, the members 20 and 21 extending in parallel relation respectively to the side portions 10 and 11. The side portions 10 and 11 and the obliquely directed members 20 and 21 are provided with means for supporting harrow or cultivator "teeth," indicated conventionally at 26, and therefore operate as "beams" to the improved implement.

The frame structure is in A shape, as shown in Fig. 2 with the teeth 26 arranged to form furrows of uniform distance apart, or uniformly cultivate the soil.

A draft chain 27 is applied to the forward narrower end of the supporting frame, as shown.

Attached to the upper face of the forward frame member 13 are transversely perforated lugs 28 having a transverse pivot pin 29, and swinging at one end upon the pin between the ears is a block member 30 having a vertical aperture in its outer end to carry a stud 31. At its lower end the stud 31 supports a yoke device 32, the latter forked to support the axle 33 of a caster wheel 34. At its upper end the stud 31 is extended upwardly to form an operating lever 35.

By this means the caster wheel is free to rotate and at the same time be adjustable vertically by force applied to the lever 35, to correspondingly elevate and depress the forward part of the frame and the teeth carried thereby.

Attached at its rear end to the supporting frame, for instance to the members 20 and 21, are brackets 36 and 37 having bearings 38 and 39 at their rear ends to rotatively receive L-shaped members 40 and 41. At their inner ends the horizontal portions of the members 40 and 41 are received in the opposite ends of a sleeve or harrow shaft 42. The sleeve 42 is provided with a plurality of spaced apertures 43, while the portions of the members 40 and 41 which enter the sleeve are correspondingly apertured to receive holding pins, by which means the members 40 and 41 may be adjustably coupled to the sleeve.

At their lower and rear ends the members 40 and 41 are provided with bearings 44 and 45 to rotatively support an axle 46 carrying bearing wheels 47 and 48.

Engaging the axle 46 is an operating lever arm 49, and engaging the sleeve 42 is a clip device 50 through which the lever arm extends, the clip being loosely coupled to the lever arm by a pin 51.

By this arrangement it will be obvious that a pulling or pushing force applied to the arm 49 will swing the axle 46 together with the rock shaft device formed by the sleeve member 42 and the L-shaped members 40 and 41, in the bearings 36 and 37 and thus elevate or depress the frame structure relative to the ground.

Supported for oscillation in bearings 52 and 53 on the frame members 13 and 21, is a relatively short rock shaft 54, extended at one end into an arm 55, and with another arm 56 extended therefrom and intermediate the ends.

The arm 56 is extended upwardly as at 57 and directed laterally to form a pedal 58 convenient to the foot of the operator on the seat 59.

The rod 60 is connected at its ends respectively to the lever arms 49 and 55, while another rod 61 is likewise connected at its ends to the arms 35 and 56.

The lever arms 35 and 49 are provided with a plurality of spaced apertures to receive the pivot pins of the rods 60 and 61, to enable the rods to be adjusted to control the "throw" of the members 35 and 49.

Attached to or formed integral with the rock shaft 54 is an actuating lever 62 provided with a pawl device represented conventionally at 63 and coacting with a notched segment 64. By this means the rock shaft 54 may be oscillated to any required extent within the range of the notched segment, to control the position of the caster wheel 34 and the bearing wheels 47 and 48, and correspondingly control the depth of the "cut" of the teeth 26.

It is obvious that when the operating lever 62 is moved into its forward position as shown in Figs. 1 and 2, the caster wheel 34 and the bearing wheels 47 and 48 will be moved into their lower position and thus elevate the supporting frame with the teeth 26 clear of the ground, to enable the implement to be readily transported, and then by adjusting the operating lever to any required intermediate point, the depth of the "cut" of the teeth may be readily and easily controlled.

By providing the foot pedal 58, the improved device may be actuated by the pressure of the foot to supplement the movement of the lever 62.

The improved device is simple in construction, can be manufactured at a relatively small expense or without material additional expense to an ordinary harrow, and the efficiency and utility of implements of this character is materially increased.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. An implement of the class described comprising a supporting frame including a plurality of beam members carrying earth engaging elements, an axle carrying bearing wheels, a rock shaft device having downturned ends engaging said axle and mounted on said frame, an operating lever connected to said axle, a clip device connecting said lever to said rock shaft device, and means for actuating said rock shaft device to cause the vertical adjustment of said bearing wheels.

2. An implement of the class described comprising a supporting frame including a plurality of beam devices carrying earth engaging elements, an axle carrying bearing wheels, a sleeve member, brackets attached to said supporting frame, L-shaped members each rotatively engaging by one arm in said brackets and attached to said sleeve and engaging said axle by the other arm, a lever arm connected to said axle, and means for actuating said lever arm to cause said axle to be rotated with said sleeve to elevate and depress the frame relative to the bearing wheels.

3. An implement of the class described comprising a supporting frame including a plurality of beam devices carrying earth engaging elements, an axle carrying bearing wheels, a sleeve member, brackets attached to said supporting frame, L-shaped members each rotatively engaging by one arm in said brackets and attached to said sleeve and engaging said axle by the other arm, a lever arm connected to said axle, a clip device connected to said sleeve and engaging said arm, and means for actuating said lever arm to cause said axle to be rotative with said sleeve to elevate and depress the frame relative to the bearing wheels.

In testimony whereof, I affix my signature hereto.

URBANO PEDROARENA.